United States Patent [19]

Hasegawa et al.

[11] Patent Number: 5,053,900
[45] Date of Patent: Oct. 1, 1991

[54] RECORDING AND/OR REPRODUCING APPARATUS PERFORMING A TRACKING CONTROL BY MOVING GUIDE MEMBERS FOR A RECORDING MEDIUM

[75] Inventors: Masahide Hasegawa; Takashi Kimura, both of Kanagawa, Japan

[73] Assignee: Cannon Kabushiki Kaisha, Tokyo, Japan

[21] Appl. No.: 347,493

[22] Filed: May 4, 1989

[30] Foreign Application Priority Data

May 16, 1988 [JP] Japan ............................ 63-118853
May 26, 1988 [JP] Japan ............................ 63-127002
May 26, 1988 [JP] Japan ............................ 63-127003

[51] Int. Cl.⁵ .......................................... G11B 5/584
[52] U.S. Cl. .............................. 360/77.13; 360/72.1; 360/70; 360/85; 360/71
[58] Field of Search ............ 360/70, 71, 72.1, 77.13, 360/84, 85, 95

[56] References Cited

U.S. PATENT DOCUMENTS

| | | | |
|---|---|---|---|
| 2,979,558 | 4/1961 | Leyton | 360/70 X |
| 4,180,839 | 12/1979 | Neff et al. | 360/71 |
| 4,369,473 | 1/1983 | Eibensteiner | 360/84 X |
| 4,389,684 | 6/1983 | Aihara | 360/71 |
| 4,485,420 | 11/1984 | Schoenmakers | 360/109 X |
| 4,639,799 | 1/1987 | Inoue | 360/85 |
| 4,672,479 | 6/1987 | Takao et al. | 360/85 X |
| 4,709,280 | 11/1987 | Delacou | 360/84 X |
| 4,945,426 | 7/1990 | Okamoto et al. | 360/70 |

*Primary Examiner*—Vincent P. Canney
*Assistant Examiner*—David L. Robertson
*Attorney, Agent, or Firm*—Robin, Blecker, Daley & Driscoll

[57] ABSTRACT

A recording and/or reproducing apparatus for recording and/or reproducing a signal on and/or from a recording medium has a pair of guides disposed along the path of running of the recording medium such that one is located on the leading side while the other is located on the trailing side of a head assembly carrying a recording and/or reproducing head. The guides are simultaneously moved in the same direction so as to adjust the position of the recording medium on the head assembly in the direction of running of the recording medium so as to effect a tracking control thereby permitting the head to trace any winding of the recording track.

24 Claims, 8 Drawing Sheets

RECORDING AND/OR REPRODUCING APPARATUS PERFORMING A TRACKING CONTROL BY MOVING GUIDE MEMBERS FOR A RECORDING MEDIUM

BACKGROUND OF THE INVENTION

1. Field of the Invention;

The present invention relates to a recording and/or reproducing apparatus and, more particularly, to a recording and/or reproducing apparatus of the type in which a tracking control is performed so as to enable a recording and/or reproducing head to follow a track on a recording medium.

2. Description of the Related Art

Recording and/or reproducing apparatus are known such as 8 mm VTRs and DATs (Digital Audio Tape Recorders). In this type of apparatus, a tracking control is essential for enabling a rotary head to correctly trace a track on a magnetic tape during reproduction. Various tracking control methods have been proposed and used, such as a method in which the speed of a capstan motor is controlled on the basis of a tracking error signal picked up from reproduced signals. In another known method, a magnetic head attached to the rotary drum is movably held by a bimorph element which is controlled in accordance with a tracking error signal so as to enable the head to trace the track.

The tracking control method relying upon the speed control of the capstan motor is disadvantageous in that a motor of high-torque and low-inertia type has to be used as the capstan motor because the speed change of the motor causes a change in the tape tension which acts as a load on the motor. The response frequency is as low as several hertz (Hz) even when such a motor is used. With this method, therefore, it has been materially essentially impossible to effect the tracking control particularly when a high response speed is required. For instance, this method cannot enable the head to follow the track when the track is warped or curved, which is experienced when a desired linearity is not attained between the tape and the rotary head.

The tracking control method which makes use of a bimorph element can provide a response frequency which is above several hundreds of hertz because only a light load is applied to the bimorph element which is required to effect a very small amount of movement. This method therefore can enable the head to well follow any warp or curve of the track. This method, however, suffers from the following disadvantage. Namely, the driving voltage for driving the bimorph element is as high as several tens of volts to a thousand volts or higher. In order to apply this high voltage to the rotary drum, it is necessary to use brushes of a precious metal for electrical connection. It is difficult to maintain a stable electrical connection even with such brushes. Since the magnetic head is movably secured through the bimorph element, troublesome efforts are required for the mounting and adjustment of the magnetic head. High reproducibility of position of the magnetic head is a very important factor particularly in the recording operation. The movable magnetic head, therefore, is usable only for the purpose of reproduction. This means that a separate head has to be used for the recording purpose. Thus, the tracking control method relying upon the bimorph element undesirably raises cost of parts and requires laborious work in the assembly, with the result that the size and the production cost are increased.

On the other hand, there is an increasing demand for high recording density, particularly in digital VTRs which handle a good deal of information. In order to realize a track pitch of 10 μm or smaller, a tracking which enables the head to follow any undulation of the track is necessary.

SUMMARY OF THE INVENTION

Accordingly, an object of the present invention is to provide an inexpensive and small-sized recording and/or reproducing apparatus having a tracking control capable of operating with a high response speed, thereby overcoming the above-described problems of the prior art.

To this end, according to the present invention, there is provided a recording and/or reproducing apparatus comprising: a head assembly carrying a recording and/or reproducing head for recording and/or reproducing a signal on and/or from a recording medium; a pair of movable guides, disposed before and behind the head assembly as viewed in the direction of running of the recording medium while a signal is recorded and/or reproduced by the recording and/or reproducing head on and/or from the recording medium, for guiding the running of the recording medium; and drive means, operable while a signal is recorded and/or reproduced by the recording and/or reproducing head on and/or from the recording medium, for driving the pair of movable guides simultaneously in the same direction.

The above and other objects, features and advantages of the present invention will become apparent from the following description of the preferred embodiments when the same is read in conjunction with the accompanying drawings.

DETAILED DESCRIPTION OF THE PREFERRED EMBODIMENTS

Embodiments of the present invention will be described hereinafter with reference to the accompanying drawings.

Figure 1:
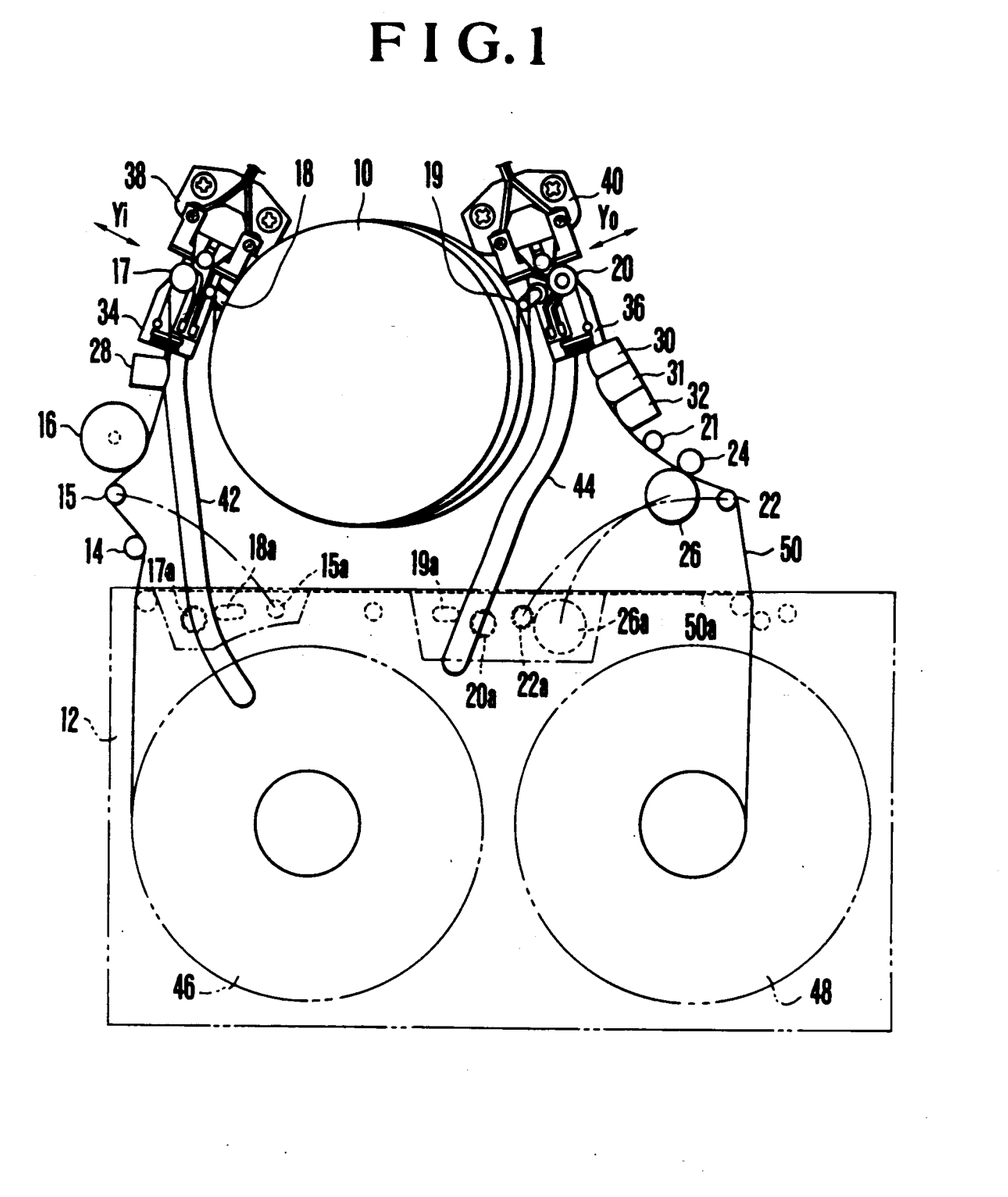
FIG. 1 is an illustration of a mechanical portion of a VTR as an embodiment of the present invention.

FIG. 1 shows in plan a mechanical portion of a VTR as an embodiment of the present invention. The VTR has, as known per se, the following parts: a rotary head drum 10; a tape cassette 12; guide posts 14 to 22; a capstan 24; a pinch roller 26; an erasing head 28; fixed heads 30 to 32; an inlet skate unit 34; an outlet skate unit 36; an inlet catcher 38; an outlet catcher 40; an inlet rail 42; an outlet rail 44; reels 46 and 48; and a magnetic tape 50.

In FIG. 1, solid lines show the mechanical portion in a loading completion state, while broken-lines show the mechanism in an unloading state, i.e., the state in which the tape 50 is housed in the cassette 12. In the unloading state, the same members or parts as in the loading completion state are designated by the same reference numerals with "a" attached thereto.

In the loading completion state, the magnetic tape 50 is wound helically around the rotary head drum 10. Recording or reproduction of signals is conducted by means of a rotary head carried by the rotary head drum 10 while the magnetic tape 50 is made to run from the reel 46 to the reel 48 by the capstan 24. In the described embodiment, posts 17 and 20 are simultaneously moved in the same direction as indicated by arrows $Y_i$ and $Y_o$ during the recording or reproduction, so as to adjust the position of the magnetic head relative to the tape 50, thereby enabling an appropriate tracking control.

The posts 17 and 20 are provided on the skate units 34 and 36 together with the posts 18 and 19. Loading of the tape 50 is performed by shifting the skate units 34 and 36, the posts 15 and 22 and the pinch roller 26 along paths shown by one-dot chain lines in FIG. 1, by means of a lever which is not shown, as publicly known per se. In order that the posts 17 and 18 just before the rotary head drum 10 and the posts 19 and 20 just behind the rotary head drum 10 are located with high positional precision, the skate units 34 and 36 are gripped by the catchers 38 and 40.

Figure 2:
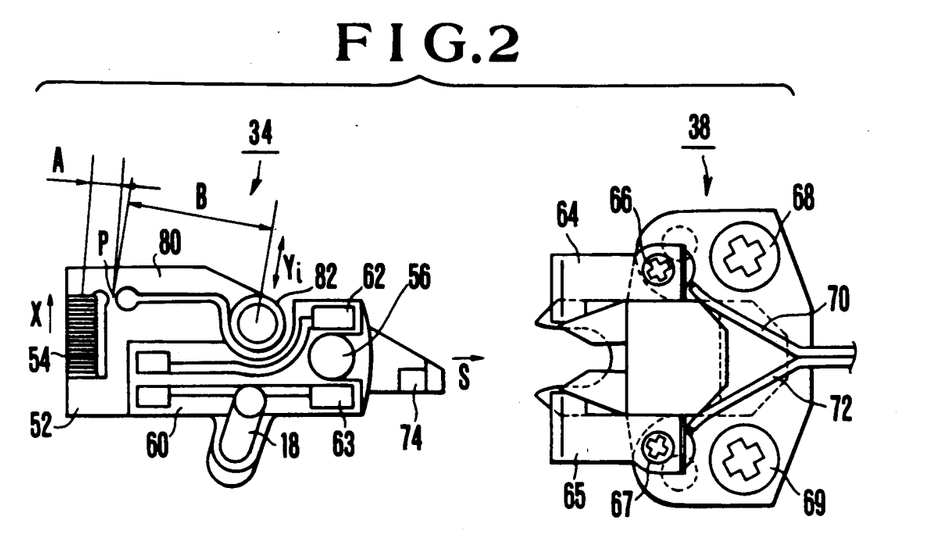
FIG. 2 is a plan view of an essential portion of the VTR shown in FIG. 1.
Figure 3:
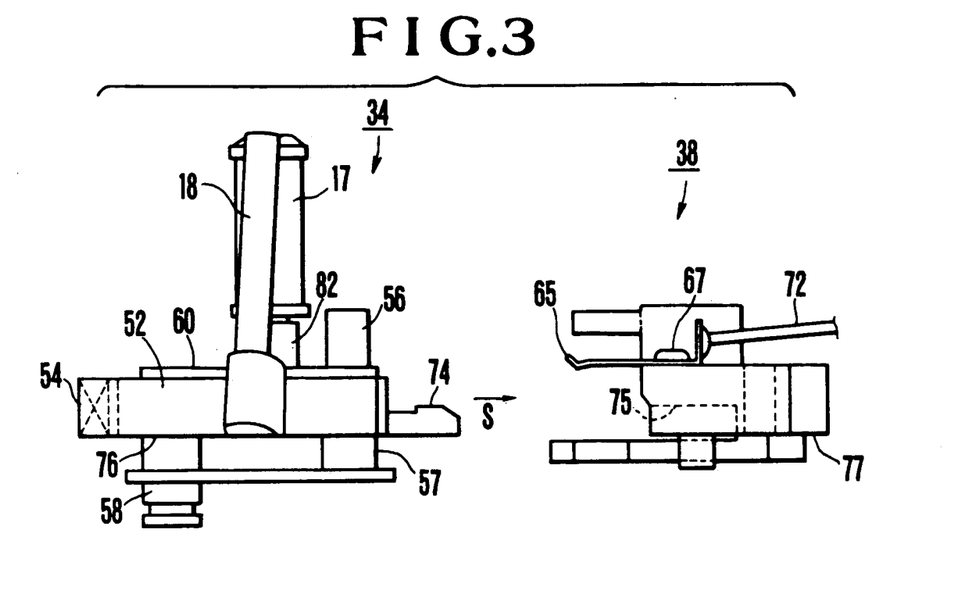
FIG. 3 is an enlarged side elevational view of an essential portion of FIG. 1.

FIGS. 2 and 3 show, in plan and in side elevation, the inlet skate unit 34 and the catcher 38 in the state immediately before the former is engaged by the latter. For the purpose of clarification of the drawings, the post 17 is omitted from FIG. 2, while screws 68 and 69 shown in FIG. 2 omitted from FIG. 3. A reference numeral 52 denotes a base, 54 denotes a piezoelectric element, 56, 57 and 58 denote pins, 60 denotes a circuit board, 62 and 63 denote electrical contacts on the circuit board 60, 64 and 65 denote terminals, 66 to 69 denote screws, and 70 and 72 denote leads. A pressing of the pin 58 by a lever which is not shown causes the skate unit 34 to be moved in the direction of an arrow S, so that the pins 56 and 57 are brought into engagement with a V-groove and a U-groove of the catcher 38, so that an abutting surface 74 of the end of the base 52 abuts a positioning surface 75 of the catcher 38 while the underside 76 of the base 52 abuts a reference surface of a chassis (not shown), whereby the skate unit 34 is positioned. The catcher 38 is fixed by the screws 68 and 69, with its lower surface 77 contacting the reference surface of the chassis.

When the skate unit 34 engages with the catcher 38, the electrical contacts 62 and 63 of the circuit board 60 fixed to the upper surface of the base 52 are brought into electrical connection with terminals 64 and 65 fixed by the screws 66 and 67 to the catcher 38, thus enabling supply of electrical power to the piezoelectric element 54 on the skate unit 34 through leads 70 and 72. Needless to say, the electrical contacting portions of the described parts may be suitably plated with, for example, gold, for the purpose of reducing the contact resistance. In the described embodiment, an electrically insulating plastic material is used as the material of the catcher 38, and the terminals 64 and 65 are directly fixed to the catcher 38. When the catcher 38 is made of a conductive material such as a metal, the terminals 64 and 65 maybe directly fixed to the catcher 38 through an insulating plate such as a circuit board.

The piezoelectric element 54 is of a so-called lamination type which changes its thickness according to the voltage applied thereto. Thus, the piezoelectric element is expandable and contractable in the direction of an arrow X. The expansion and contraction of the piezoelectric element cause the arm 80 to be moved in the direction of an arrow Y around a point P on the base 52. The amount of expansion and contraction of the laminate type piezoelectric element 54 is in general as small as several tens of micron meters ($\mu$m) or smaller. Therefore, an arm 80 is used such that the length B (see FIG. 2) of the arm 80 is much greater than the distance A between the fulcrum P and the piezoelectric element 54 so that the small expansion or contraction of the piezoelectric element 54 is increased by the principle of leverage by B/A to provide an amplitude of 100 $\mu$m or greater. A pin 82 provided on the end of the arm 80 rotatably supports the post 17.

The skate unit 36 and the catcher 40 on the outlet side are constructed and arranged in the same manner as the skate unit 34 and the catcher 38 on the inlet side, so that the inlet side post 17 and the outlet side post 20 are movable in the directions of the arrows $Y_i$ and $Y_o$ in FIG. 1. When the piezoelectric element associated with the skate unit 36 is controlled in the expanding direction, the piezoelectric element associated with the skate unit 34 is controlled in the contacting direction. With this arrangement, it is possible to move the tape 50 on the rotary head drum 10.

Figure 4:
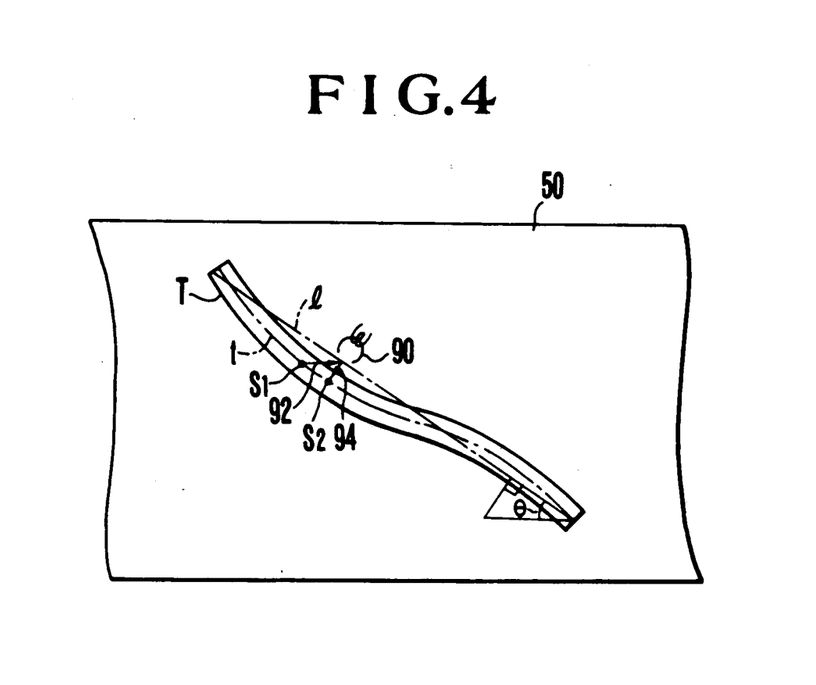
FIG. 4 is an illustration of a track pattern on a tape.

The tracking control operation performed by the described mechanism will be described hereinafter. Referring to FIG. 4 showing the track pattern of a magnetic tape 50, a symbol T represents the track after the recording, l represents the tracing locus of the center of a magnetic head 90 carried by the rotary head drum 10, and t represents the locus of movement of the center of the track T. The locus l and the locus t wind with respect to straight lines with winding amplitude on the order of several micron meters ($\mu$m) with respect to a straight line. Control techniques presently available can reduce the winding amplitude only to 3 to 10 ($\mu$m). Therefore, when the track width is reduced to such minimum winding amplitude, the position of the rotary head easily comes off the desired track as illustrated in FIG. 4. In the described embodiment, the magnetic tape 50 is instantaneously moved in the longitudinal direction of the tape as shown by an arrow 92 in FIG. 4, by adjusting the positions of the posts 17 and 20, in full contrast to the conventional tracking control method in which the magnetic head 90 is moved in the direction orthogonal to the track T as indicated by an arrow 94 in FIG. 4.

In general, the winding of the track has many components but most of them have one to two periods per track. Therefore, the response speed for enabling the head to trace the track one to 2 times as high as the rotation speed of the rotary head drum. It is assumed here that the angle $\theta$ of inclination of the track is 6° and the maximum value from peak to peak of offset of l from the track center t is 10 $\mu$m. In such a case the amount of movement required for the magnetic tape 50 for effecting the tracking control is calculated as 10 $\mu$m/sin 6° $\approx$ 96 $\mu$m. Thus, the tracking can be performed satisfactorily when the maximum stroke of the posts 17 and 20 on the of 100 μm or so is obtained as described above.

In FIG. 4, symbols $S_1$ and $S_2$ show the positions of the head on the track, as obtained when the head 90 is moved and when the tape 50 is moved, respectively. This difference in the position appears as an offset of the time axis of the reproduced signal. In the case of an analog recording system, this offset of the time axis undesirably causes a jitter. In such a case, therefore, it is necessary to employ a suitable measure such as a correction of the time axis by a time axis correction circuit or a change in the speed of rotation of the rotary drum. Conversely, in the case of a digital recording system, no substantial problem is caused by the offset of the time axis because the data is reproduced in accordance with clocks which follow the reproduction signal by the PLL.

Figure 5:
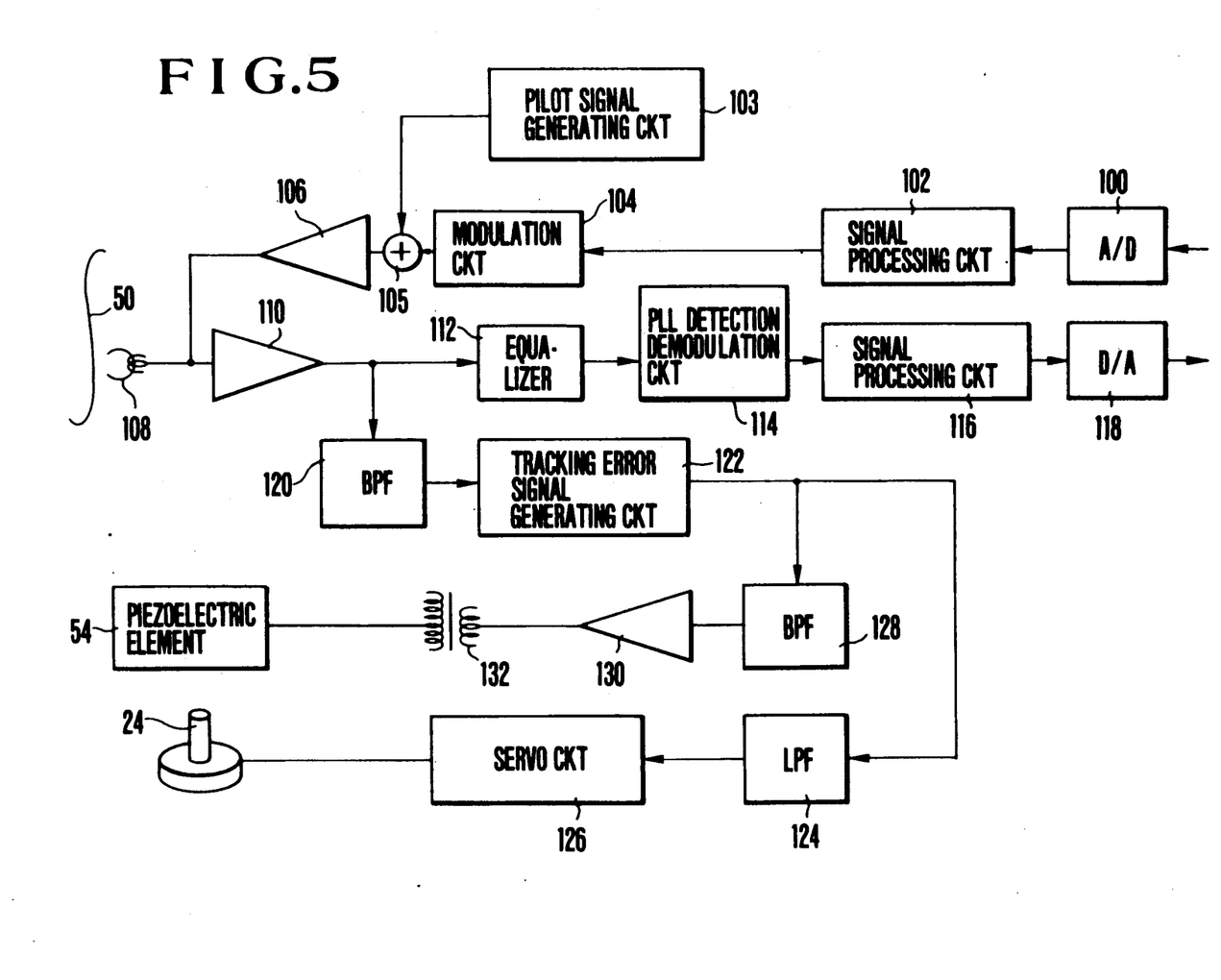
FIG. 5 is a circuit diagram showing the circuit of the VTR shown in FIG. 1.

FIG. 5 is a block diagram of a recording/reproducing circuit including a circuitry for the tracking. In this case, a known four-frequency type control system, ordinarily used in 8 mm VTRs, is used in this circuit by way of example. In recording a signal, an analog input video signal is digitized by an A/D converter 100 and a processing such as addition of an error signal and an interleave are effected by a digital signal processing circuit 102. The processed video signal is modulated into a signal suitable for magnetic recording, by means of the modulation circuit 104 and is then supplied to the adder 105. Then, a tracking control pilot signal generated by a pilot signal generating circuit 103 is added to the modulated signal. The signal is then suitably amplified by a recording amplifier 106 and is applied to a magnetic head 108, whereby the signal is recorded on the magnetic tape 50. Needles to say, the magnetic head 108 may be arranged in plural. It is unnecessary to apply a voltage to the piezoelectric element 54 during recording. The capstan 24 is required only to drive the magnetic tape 50 at a constant speed.

The reproducing operation is as follows. The reproduction output from the head 108 is amplified by a reproduction amplifier 110 and is shaped by an equalizer 112 and is demodulated by the PLL detection demodulation circuit 114 in the order reverse to that in the recording. Then processes such as error correction and de-interleave are performed by a digital signal processing circuit 116. The output from the processing circuit 116 is converted into an analog signal by means of a D/A converter 118. The tracking control signal, which is superposed to a digital signal in a low-frequency band of the reproduction signal, is picked up by means of a band-pass filter (BPF) 120. On the other hand, a tracking error signal generating circuit 122 generates a tracking error signal from the output of the BPF 120 in a manner known per se. A tracking error signal delivered from the circuit 122 is applied to a capstan servo circuit 126 through a low-pass filter 124 so as to control the running speed of the tape 50 through a control of the capstan 24.

In general, however, the response frequency of the tracking servo system relying upon the control of the capstan 24 is as low as several hertz (Hz) or lower due to inertia and load on the capstan motor. Such a low response frequency is insufficient for enabling the head to trace any winding or curvature of the track. It may be possible to overcome this problem, by the use of a high-torque low-inertia motor as the capstan motor. Such a countermeasure, however, is not preferred because such a motor causes a fluctuation in the signals reproduced by the fixed heads 30, 31 and 32 which are in the tape path. In order to overcome this problem, in this embodiment of the invention, a frequency component corresponding to the winding of the track is picked up from the tracking error signal by means of a BPF 128 and is applied to the piezoelectric element 54 after boosting by an amplifier 130 and the transformer 132, thereby causing the piezoelectric element 54 to drive the posts 17 and 20 simultaneously in the same direction as explained before, whereby the magnetic tape 50 is made to move. This operation is encountered only with a small resistance or load produced as a result of friction between the magnetic tape 50 and the posts 18 and 19 and the rotary head drum 10. In addition, no influence is caused on the signal reproduced by the fixed heads 30, 31 and 32.

In general, the driving voltage for driving the piezoelectric element 54 is as high as several hundreds to several thousands volts. In the described embodiment, however, it suffices only to apply the high-frequency component of the tracking error signal to the piezoelectric element 54. This can be done by means of a transformer so that the cost of the circuit can be reduced. The piezoelectric elements 54 secured to the skate units 34 and 36 are supplied with electrical power through contacts 62 and 63 and terminals 64 and 65. Such contacts and terminals can be made of inexpensive material because they are required only to make and break the contact at the time of loading, unlike the brushes used in the conventional apparatus.

Figure 6:
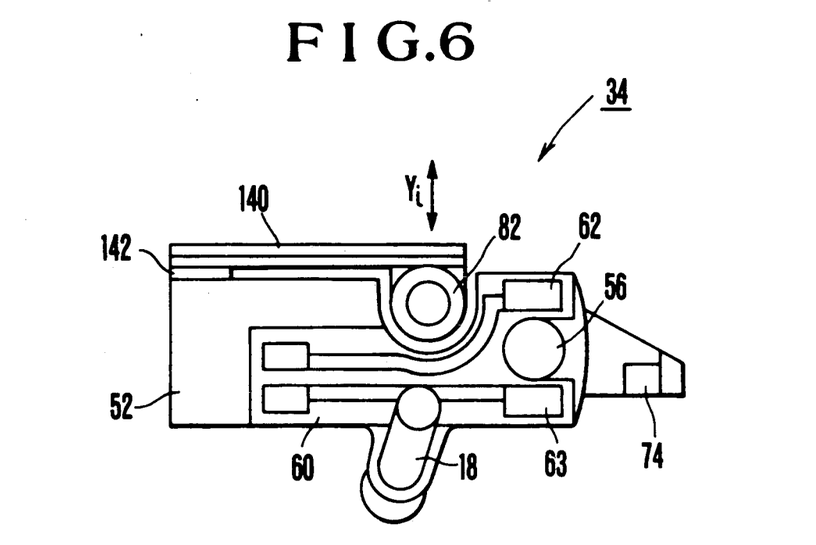
FIG. 6 is an illustration of a modification of the VTR shown in FIG. 1.

FIG. 6 shows a modification of the skate unit. In this figure, the same reference numerals are used to denote the same parts or members as those appearing in FIG. 2. In this modification, a bimorph-type element 140 is used as the piezoelectric element. The piezoelectric element 140 is fixed to a base 52 through an intermediary of a spacer 142 which provides a predetermined space between the piezoelectric element 140 and the base 52. The bimorph-type piezoelectric element is composed of a pair of piezoelectric elements of different directions of polarization bonded together, and is deflected in accordance with the level of the voltage applied thereto, so as to cause a movement of the post 17 in the direction Y of FIG. 6.

In the embodiment described above, the contacts 62 and 63 of the skate units 34 and 36 and the terminals 64 and 65 of the catchers 38 and 40 are electrically connected upon completion of the loading so as to temporarily form a path of electrical power supply to the piezoelectric element 54 which serves as post driving means. The electrical power supply to the piezoelectric element 54, however, may be provided by a permanent wiring such as leads and a flexible substrate, if such a permanent wiring does not hinder the movement of the magnetic tape and other parts when the skate units 34 and 36 carrying the piezoelectric elements 54 are moved.

Thus, the described embodiment allows a tracking control for enabling a head to trace any winding of a track by a simple construction. This in turn makes it possible to produce a recording/reproducing apparatus operative with narrow tracks, i.e., with a high recording density.

Another embodiment of the invention will be described hereinafter.

Figure 7:
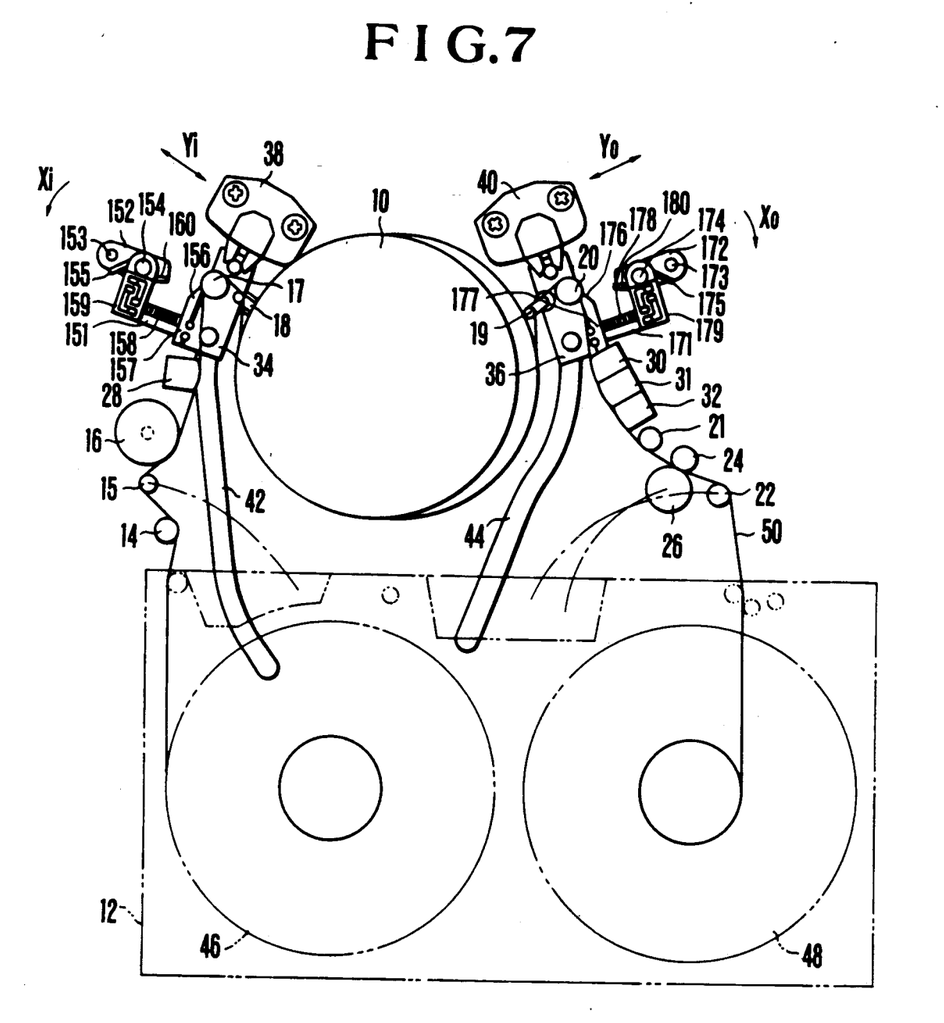
FIG. 7 is an illustration of a mechanical portion of a VTR as another embodiment of the present invention.

FIG. 7 illustrates a mechanical portion of a VTR as another embodiment of the invention. In this figure, the same reference numerals are used to denote the same parts or members as those appearing in FIG. 1, and description of such parts or members is omitted to avoid duplication of explanation. The mechanism shown in FIG. 7 is in the state after completion of the tape loading. Loci or paths of movement of the posts 15 and 22 and the pinch roller 26 in the tape housing condition are shown by one-dot chain lines by way of reference. The embodiment shown in FIG. 7 is based on the same principle as that of the first embodiment: namely, the posts 17 and 20 are simultaneously moved in the directions of arrows $Y_i$ and $Y_o$ during recording or reproduction so as to adjust the position of the magnetic head relative to the tape 50, thereby enabling adequate tracking control. The mechanism for moving the posts 17 and 20 will be described below. Levers 151 and 152 are provided at the inlet side. These levers are adapted to be rotated in the direction of an arrow Xi at the time of tape loading, about the axis 154 of a pin 153 on the lever 152, by the action of a lever or the like member which is not shown. As a result, the lever 151 is pressed by the action of a torsion spring 155 against a portion of an arm 156 of the skate unit 34 carrying the post 17, near a fulcrum 157 which is on a base portion of the arm 156. The portion of the arm 156 near the fulcrum 157 is made of an elastic material. A laminate-type piezoelectric element 158 fixed to the lever 151 is capable of being supplied with electrical power from a circuit board 159.

When a driving voltage is applied to the piezoelectric element 158 with the lever 151 pressed onto the portion of the arm 156 near the fulcrum 157, the arm 156 is swung about the fulcrum 157, thereby enabling the post 17 to be adjusted in the direction of the arrow Yi. In general, a laminate-type piezoelectric element can produce a displacement which is as small as several tens of micron meters ($\mu$m) at the greatest. In this embodiment, therefore, the displacement is amplified 10 times by the arm 156 which serves as a lever.

A similar construction is provided at the outlet side. Namely, the arrangement at the outlet side includes levers 171 and 172, a pin 173 with an axis 174 of rotation, a torsion spring 175, an arm 176 of the skate unit 36, a fulcrum 177 for rotation of the arm 176, a laminate-type piezoelectric element 178, and a circuit board 179 for supplying a driving voltage to the piezoelectric element 178. As is the case of the arrangement on the inlet side, the portion of the arm 176 around the fulcrum 177 is made of an elastic material.

Figure 8:
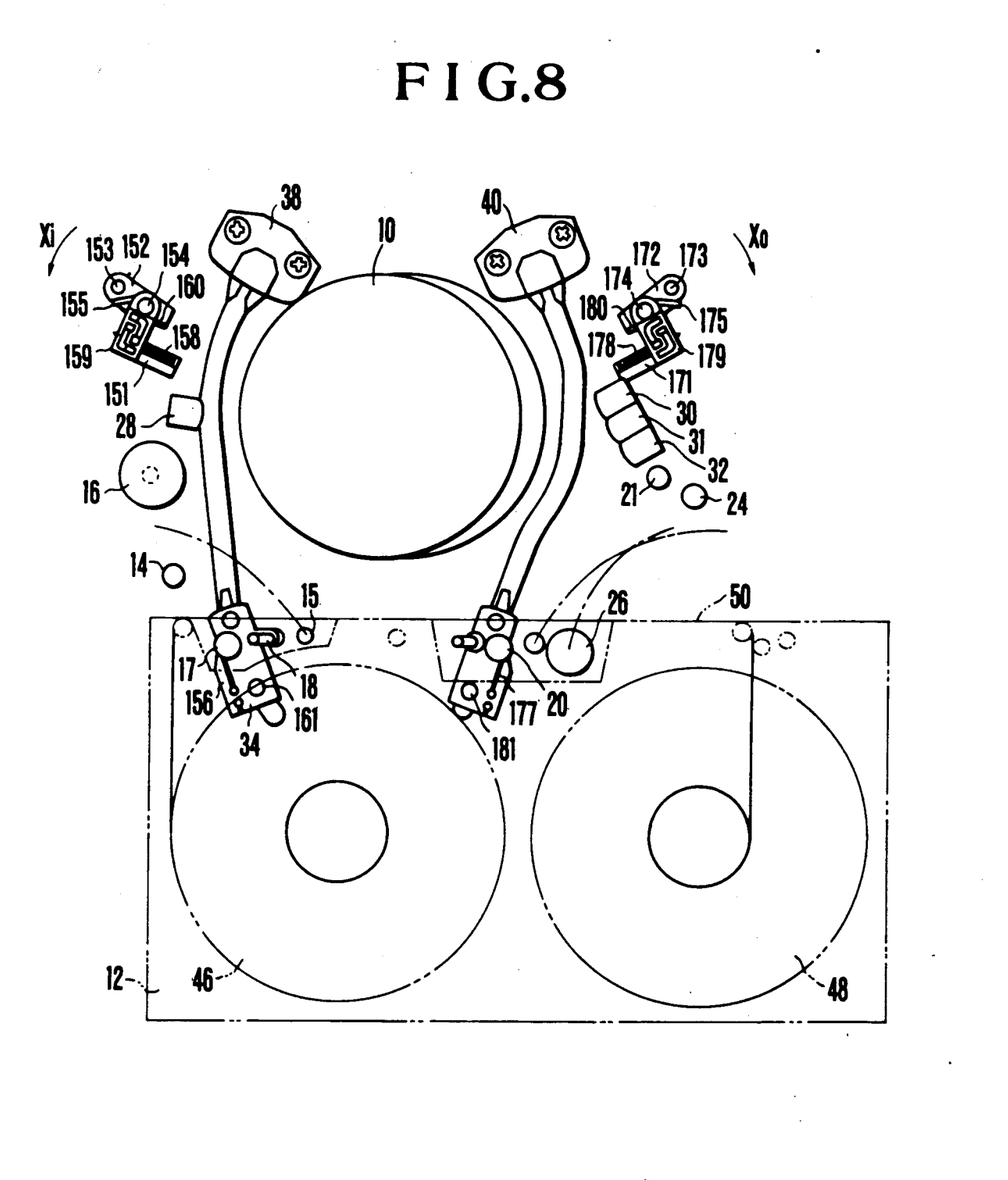
FIG. 8 is an illustration of the VTR mechanism of FIG. 7 is an unloading state.

FIG. 8 shows the mechanism of FIG. 7 in a tape unloading state. When the lever 152 on the inlet side and the first lever 172 on the outlet side are rotated in the directions opposite to the arrows $X_i$ and $X_o$ by the action of the pins 153 and 173, the levers 151 and 171 are rotated as they are pushed by projections 160 and 180 of the levers 154 and 174 into positions where they do not hinder the movement of the skate units 34 and 36. Needles to say, the arrangement is such that the movement of the pins 153 and 173 is effected during charging of these units by a spring after being stopped by the catchers 38 and 40 or after the charging. The movement of the skate unit 34 and 36 is caused by levers or suitable members which push the pins 161 and 181. Needless to say, however, the direction of movement of the skate units 34 and 36 is not reverse to that of the pressing force acting on the levers 151 and 171 in the loading completion state shown in FIG. 7.

The tracking control operation performed by the mechanism shown in FIGS. 7 and 8 is substantially the same as that of the embodiment described before in connection with FIGS. 1 to 5, so that description of operation is omitted.

It is to be pointed out, however, the embodiment shown in FIGS. 7 and 8 also provides a simple construction which enables the head to trace any winding of the track on the recording tape, thus realizing a recording-/reproducing apparatus operable with narrow tracks, i.e., with a high recording density, as is the case of the embodiment described in connection with FIGS. 1 to 5. In addition, the electrical contact for the supply of the electrical power to the piezoelectric elements 158 and 178 are dispensed with, thus contributing to a simplification of the construction.

Figure 9:
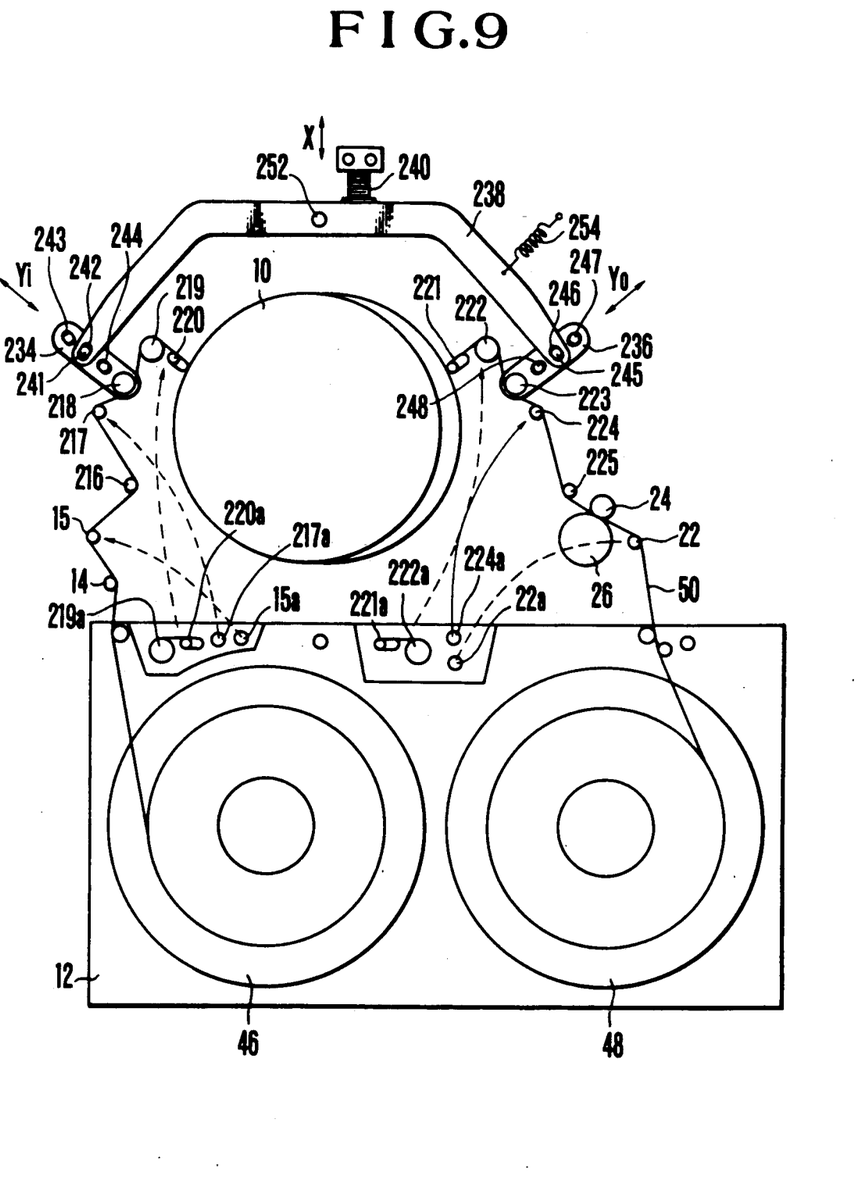
FIG. 9 is an illustration of a mechanical portion of a VTR as still another embodiment of the invention.

FIG. 9 is an illustration of a mechanical portion of a VTR which is still another embodiment of the present invention. In this figure, the same reference numerals are used to denote the same parts or members as those appearing in FIG. 1. Numerals 216 through 225 denote tape guide posts. An inlet-side lever 234 and an outlet-side lever 236 are movable in the directions of arrows Yi and Yo, respectively. A numeral 238 denotes a rocker lever, while a numeral 240 designates a laminate-type piezoelectric element for driving the rocker lever 238. A pin 241 is provided on the inlet-side lever 234 and is loosely received by a hole 242 formed in the end of the rocker lever 238. Numerals 243 and 244 denote guide pins which limit the direction of movement of the inlet-side lever 234. With this arrangement, it is possible to convert the movement of the rocker lever 238 into a movement of the inlet-side lever 234 in the direction of the arrow Yi. Similarly, a pin 245 is provided on the outlet-side lever 236 and is loosely received in a hole 246 formed in the end of the rocker lever 238. Numerals 247 and 248 denote guide pins for limiting the direction of movement of the outlet-side lever 236. With this arrangement, it is possible to convert the movement of the rocker lever 238 into a movement of the outlet-side lever 236 in the direction of an arrow Yo. A numeral 252 denotes a shaft which serves as a fulcrum for the rocking motion of the rocker lever 238, while 254 denotes a spring for pre-loading the piezoelectric element 240.

FIG. 9 shows the mechanism in a loading completion state. This figure also shows positions of parts in the state after the housing of the tape 50 in the cassette 12, with "a" attached to each of reference numerals designating these parts. The loci or paths of movement of these parts from the positions where they are set in the tape housing state to the positions where they are set in the loading completion state are indicated by broken-line arrows. Namely, the posts 15, 22, 217, 219, 220, 221, 222 and 224 on the inner side of the tape running path are moved, by the action of a lever which is not shown, from the positions in the window of the cassette 12 denoted by 15a, 22a, 217a, 219a, 220a, 221a, 222a and 224a to the illustrated positions along the paths shown by the broken-line curves, thereby forming the tape-running path. Then, by a mechanism which is known per se, the pinch roller 26 is moved from upper side into contact with the capstan 24 after the tape running path is formed. .

Then, the capstan 24 is driven so as to cause the magnetic tape 50 from the reel 46 to the reel 48 and, at the same time, the rotary head drum 10 is rotated for recording or reproduction. In the loading completion state, the magnetic tape 50 is wound onto the rotary head drum 10 helically.

In this embodiment, the posts 218 and 223 are simultaneously moved by the piezoelectric element 240 in the directions of arrows Yi and Yo during recording and reproduction, thereby adjusting the position of the magnetic tape relative to the tape 50, thus realizing an adequate tracking control. More specifically, when the driving voltage corresponding to the tracking error signal is applied to the piezoelectric element 240, the piezoelectric element 240 produces a displacement in the direction of the arrow X substantially in proportion to the voltage applied thereto. This causes a corresponding amount of rocking of the rocker lever 238 so that the inlet-side lever 234, i.e., the post 218, and the outlet-side lever 236, i.e., the post 223, are respectively moved in the directions of arrows Yi and Yo, due to the mutual engagement between the holes 242, 246 and the pins 241, 245 and the presence of the guide pins 243, 244, 247 and 248. Although the displacement produced by the piezoelectric element 40 is as small as several to several tens of micron meters ($\mu$m), large displacements of the holes 242 and 246 on the order of 100 $\mu$m or greater can be obtained by pressing the piezoelectric element against the portion of the rocker lever 238 near the shaft 252.

Simultaneously with the displacement of the post 218 in the direction for slackening the magnetic tape 50 at the inlet side of the rotary head drum 10, the post 223 is moved by the same amount as the post 218 in a direction to tension the magnetic tape 50. In consequence, the portion of the magnetic tape 50 between the posts 218 and 223 is moved from the inlet side to the outlet side of the rotary head drum 10 along the path of running of the tape 50. Conversely, when the post 218 moves in the direction for tensioning the tape 50, the post 223 moves in the direction for slackening the tape 50. It will be seen that the movement of the magnetic tape 50 in the direction of running thereof can be effected without encountering with a substantial change in the tape tension because the posts 218 and 223 are moved by an equal amount.

During the running of the tape, the tension applied to the tape in the region near the post 218 is 1.3 to 2.0 times as high as the tension applied to the tape portion near the post 223. The moments applied to the rocker lever 238, however, negate each other so that a pressing force corresponding to 0.3 to 1.0 times of that produced in the region near the post 223 is actually applied to the piezoelectric element 240, thus attaining a remarkable reduction in the load. In a case where the tape 50 has to be driven in the reverse direction, the tensions are reversed so that a negative force is applied to the piezoelectric element 240. It is therefore advisable to pre-load the piezoelectric element 240 by a spring 254.

The tracking control operation performed by this mechanism is substantially the same as that explained in connection with FIG. 1, so that description thereof is omitted.

The amplification of the displacement produced by the piezoelectric element, which is performed by the rocker lever 238 in this case, may be performed by a suitable link mechanism. Such a modification will be described with reference to FIG. 10. In this figure, the same reference numerals are used to denote the same parts or members as those appearing in FIG. 9, and detailed description thereof is omitted.

Figure 10:
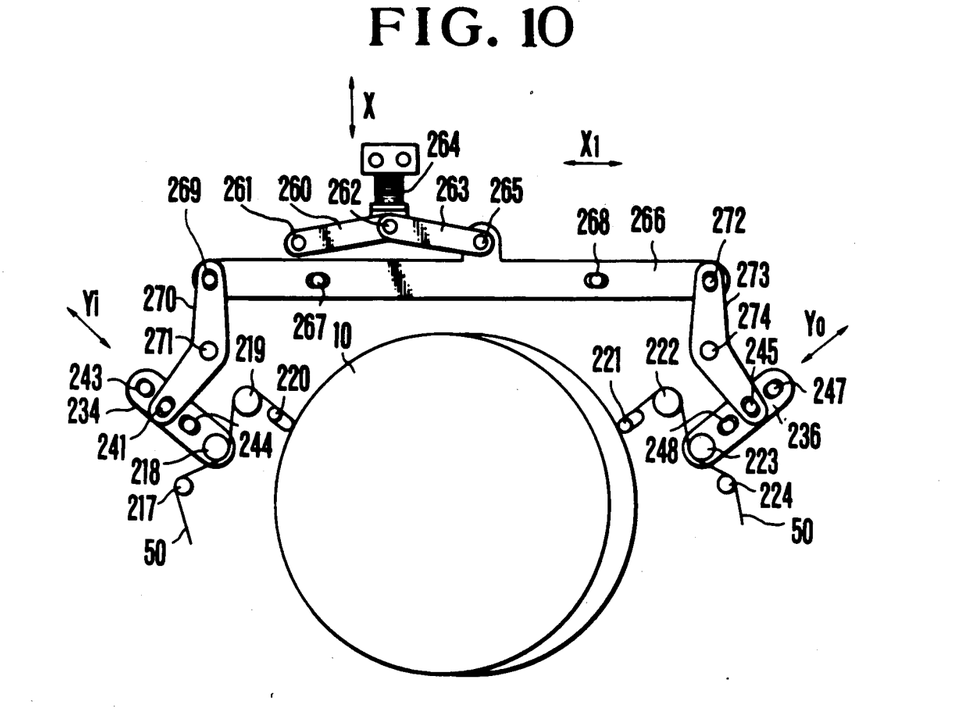
FIG. 10 is an illustration of a modification of the VTR shown in FIG. 9.

A lever 260 is swingably supported at its one end by a shaft 261 provided on a chassis. The other end of the lever 260 is connected through a pin 262 to a lever 263.

The arrangement is such that the surface of the piezoelectric element 264 drives the pin 262. The end of the lever 263 is connected to a lever 266 through a pin 265, and the lever 266 is guided by guide pins 267 and 268 so as to move only in the direction of the arrow $X_1$. In consequence, the displacement produced by the piezoelectric element 264 in the direction X is amplified by the levers 260 and 263 and is converted into a large displacement of the lever 266 in the direction $X_1$.

The lever 266 is provided at its one end with a pin 269 which is engaged by one end of a lever 270 so that the lever 270 is rotatable about the axis of the shaft 271. The other end of the lever 270 engages with the pin 241 on the lever 234. Therefore, a displacement of the lever 266 in the direction $X_1$ causes the lever 270 to rotate about the axis of the shaft 271, which in turn causes a corresponding displacement of the lever 234 in the direction Yi. Similarly, the lever 266 is provided at its other end with a pin 272 which is engaged by one end of a lever 273 rotatable about the axis of a shaft 274. The other end of the lever 273 engages with a pin 245 on the lever 236. In consequence, a displacement of the lever 266 in the direction X1 causes a displacement of the lever 236 in the direction Yo. Thus, the displacement generated by the piezoelectric element 264 causes the posts 218 and 223 to move in the directions Yi and Yo, respectively, thereby shifting the tape 50 forward or backward in the direction of running thereof. In this embodiment, the inertia can be reduced rather easily as compared with the embodiment of FIG. 9, so that a higher response frequency can be obtained.

Figure 11:
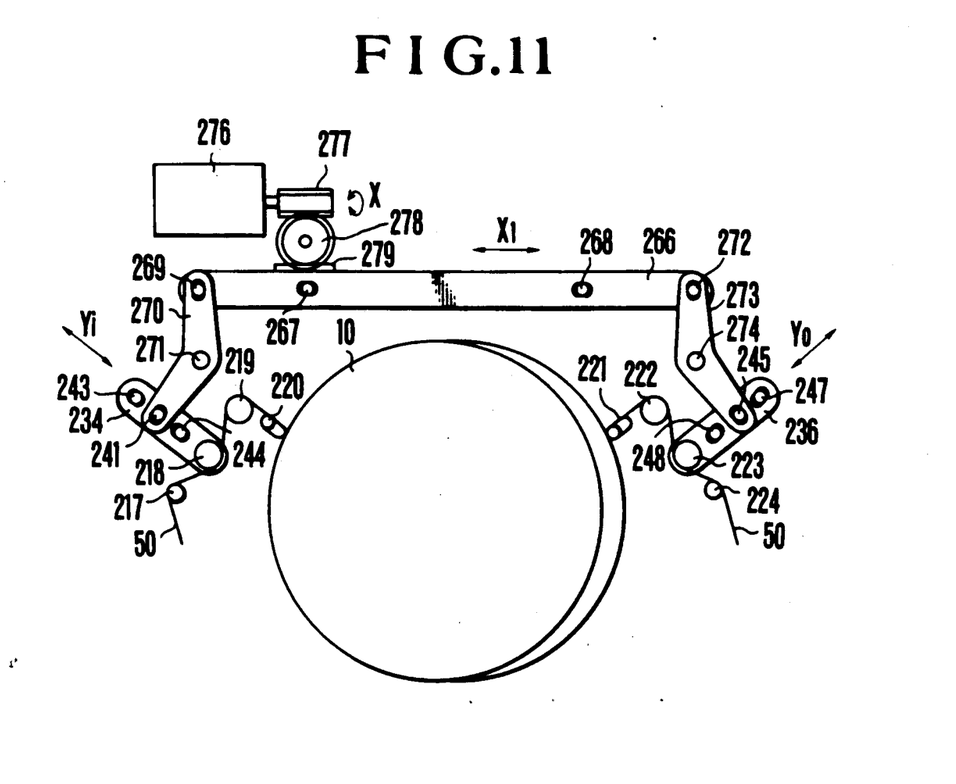
FIG. 11 is an illustration of another modification of the VTR shown in FIG. 9.

The embodiment shown in FIG. 10 employs a piezoelectric element 264 as the source of the driving power. This, however, is not exclusive and the embodiment shown in FIG. 10 may be modified such that a pulse motor is used in place of the piezoelectric element 264, as will be explained hereinafter with reference to FIG. 11. In FIG. 11, the same reference numerals are used to denote the same parts or members as those appearing in FIG. 10, and parts which are common to those in the arrangement shown in FIG. 9 are omitted.

The modification shown in FIG. 11 has a pulse motor 276, a worm gear 277, a gear 278 and a rack 279 which is fixed to the lever 266. The output rotation of the pulse motor 276 is transmitted to the rack 279 at a reduced speed through the worm gear 277 and the gear 278 so as to move the lever 266 in the direction $X_1$. In consequence, as in the case of FIG. 10, the posts 218 and 223 are displaced in the directions Yi and Yo, respectively. Although the pulse motor 276 in general cannot have high resolution, the positions of the posts 218 and 223 can be controlled with a resolution of 10 $\mu$m or less through the speed reduction conducted at a suitable speed reduction ratio. The response characteristic of this modification depends on the characteristic of the pulse motor. It will be apparent, however, that the pulse motor provides a higher response frequency as compared with the case where the tracking is controlled by controlling the speed of the capstan motor. A higher response speed can be obtained when a low-inertia and high-output motor such as a core-less motor is used as the motor 276.

In the VTRs shown in FIGS. 9, 10 and 11, employing the tracking control in accordance with the present invention, an excellent tracking control can be performed to enable the head to well trace any winding of the track, simply by driving a single connecting member (238, 266). This control requires only a single tape guide driving mechanism so that advantages are brought about over the arrangements of FIGS. 1 and 7 such as simplification of the electrical wiring.

What is claimed is:

1. A reproducing apparatus comprising:
   (a) a head assembly carrying a rotary reproducing head for reproducing a signal from a recording medium;
   (b) a pair of movable guides, disposed before and behind said head assembly as viewed in the direction of running of said recording medium while a signal is reproduced by said reproducing head from said recording medium, for guiding the running of said recording medium;
   (c) detection means for detecting any positional deviation of said rotary reproducing head from a track formed on said recording medium by using signals reproduced by said rotary reproducing head to generate a tracking error signal; and
   (d) drive means operable, while a signal is reproduced by said rotary reproducing head from said recording medium, for driving said pair of movable guides in relation to each other according to said tracking error signal.

2. An apparatus according to claim 1, wherein said drive means includes a connecting member for mechanically interlocking said pair of movable guides, and a driving power generator for driving said connecting member.

3. An apparatus according to claim 2, wherein said driving power generator includes a piezoelectric element which is fixed at its one end and connected at its other end to said connecting member.

4. An apparatus according to claim 1, wherein said recording medium is a tape-shaped recording medium, said apparatus further comprising a pair of tape loading members movable between a first position in the vicinity of said head assembly and a second position far from said head assembly to change a path of running of said tape-shaped recording medium.

5. An apparatus according to claim 4, wherein said pair of movable guides are held by said pair of tape loading members.

6. An apparatus according to claim 5, wherein each of said pair of tape loading members includes a movable member movable when said pair of tape loading members are in said first position, and wherein each of said pair of movable guides is held by said movable member.

7. An apparatus according to claim 6, wherein said drive means is held on said pair of tape loading members.

8. An apparatus according to claim 5, wherein said pair of tape loading members are rockable in a direction which crosses the direction of movement thereof between said first and second positions.

9. An apparatus according to claim 8, wherein said drive means is fixed at a position in the vicinity of said first position.

10. A reproducing apparatus comprising:
    (a) a head assembly carrying a rotary reproducing head for reproducing a signal from a recording medium;
    (b) a pair of movable guides, disposed before and behind said head assembly as viewed in the direction of running of said recording medium while a signal is reproduced by said rotary reproducing head from said recording medium, for guiding the running of said recording medium;
    (c) a connecting member for mechanically interlocking said pair of movable guides while a signal is reproduced by said rotary reproducing head from said recording medium;
    (d) a detection circuit for detecting any positional deviation of said rotary reproducing head from a track formed on said recording medium by using signals reproduced by said rotary reproducing head to generate a tracking error signal; and
    (e) a driving member for driving said connecting member according to said tracking error signal.

11. A reproducing apparatus comprising:
    (a) a head assembly carrying a rotary reproducing head for reproducing a signal from a tape-shaped recording medium;
    (b) a tape loading member movable between a first position in the vicinity of said head assembly and a second position far from said head assembly to change a path of running of said tape-shaped recording medium;
    (c) a rocker guide supported rockably by said tape loading member for guiding the running of said tape-shaped recording medium;
    (d) detection means for detecting any positional deviation of said rotary reproducing head from a track formed on said recording medium by using signals reproduced by said rotary reproducing head to generate a tracking error signal; and
    (d) drive means operable when said tape loading member is in said first position, for driving said rocker guide according to said tracking error signal.

12. An apparatus according to claim 11, wherein said tape loading member includes a main body for carrying a stationary guide for guiding the running of said tape-shaped recording medium and a rocker member rockable relative to said main body, and wherein said rocker guide is held by said rocker member.

13. An apparatus according to claim 12, wherein said drive means is held on said tape loading member.

14. An apparatus according to claim 11, wherein said tape loading member is rockable in a direction which crosses the direction of movement of said tape loading member between said first and second positions.

15. An apparatus according to claim 14, wherein said drive means is fixed at a position in the vicinity of said first position.

16. An apparatus according to claim 11, further comprising a supporting member fixed to a main body of said apparatus for rockably supporting said rocker guide at a position in the vicinity of said first position.

17. A reproducing apparatus comprising:
    (a) a head assembly carrying a rotary reproducing head for reproducing a signal from a tape-shaped recording medium;
    (b) a movable guide for guiding the running of said tape-shaped recording medium;
    (c) detection means for detecting a positional deviation of said rotary reproducing head from a track formed on said recording medium by using signals reproduced by said rotary reproducing head to generate a tracking error signal; and
    (d) drive means for driving said movable guide in accordance with said tracking error signal.

18. An apparatus according to claim 17, wherein a pair of said movable guides are provided before and behind said head assembly as viewed in the direction of running of said recording medium, and wherein said drive means includes a connecting member for interlocking said pair of movable guides and a driving power generator for driving connecting member.

19. An apparatus according to claim 17, further comprising: a tape loading member movable between a first position in the vicinity of said head assembly and a second position far from said head assembly to change a path of running of said tape-shaped recording medium.

20. An apparatus according to claim 19, wherein said movable guide is held by said tape loading member.

21. An apparatus according to claim 20, wherein said drive means is held by said tape loading members.

22. An apparatus according to claim 20, wherein said drive means is fixed at a position in the vicinity of said first position.

23. An apparatus according to claim 17, further comprising transporting means for transporting the tape-shaped recording medium in a longitudinal direction thereof in accordance with said tracking error signal.

24. An apparatus according to claim 23, wherein said drive means drives said movable guide in accordance with a first frequency band of said tracking error signal, said transporting means transporting the tape-shaped recording medium in accordance with a second frequency band of said tracking error signal, said first frequency band being higher than said second frequency band.

* * * * *

UNITED STATES PATENT AND TRADEMARK OFFICE
CERTIFICATE OF CORRECTION

PATENT NO. : 5,053,900

DATED : October 1. 1991

INVENTOR(S) : Masahide Hasegawa, et al

It is certified that error appears in the above-identified patent and that said Letters Patent is hereby corrected as shown below:

```
Col. 1, line 37.    Delete "materially"
Col. 1, line 38.    After "control", insert -- , --
Col. 2, line 53.    Change "is" to -- in --
Col. 3, line 40.    After "2", insert -- are --
Col. 4, line 3.     Change "maybe" to -- may be --
Col. 5, line 34.    Change "Needles" to -- Needless --
Col. 6, line 18.    Change "hundreds" to -- hundred --
Col. 6, line 19.    Change "thousands" to -- thousand --
Col. 7, line 55-56. Change "Needles" to -- Needless --
```

Signed and Sealed this

Thirtieth Day of March, 1993

*Attest:*

STEPHEN G. KUNIN

*Attesting Officer*     *Acting Commissioner of Patents and Trademarks*